(12) United States Patent
Livingston et al.

(10) Patent No.: US 8,113,778 B2
(45) Date of Patent: Feb. 14, 2012

(54) WIND TURBINE BLADE STOWAGE

(75) Inventors: Jamie T. Livingston, Simpsonville, SC (US); Nicholas J. Tobergte, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1089 days.

(21) Appl. No.: 11/961,311

(22) Filed: Dec. 20, 2007

(65) Prior Publication Data
US 2009/0159477 A1    Jun. 25, 2009

(51) Int. Cl.
*F01D 7/00* (2006.01)

(52) U.S. Cl. ......... 416/87; 416/88; 416/142; 416/244 R; 290/44; 290/55

(58) Field of Classification Search ............ 416/87, 416/88, 101, 119, 142, 143, 244 R; 290/45, 290/55
See application file for complete search history.

(56) References Cited

U.S. PATENT DOCUMENTS

| 2,335,692 | A | * | 11/1943 | Murray ............... 414/346 |
| 2,725,241 | A | * | 11/1955 | Leonard, Jr ........... 410/44 |
| 3,814,351 | A | * | 6/1974 | Bielawa ............ 244/17.19 |
| 5,630,705 | A | * | 5/1997 | Eikelenboom ......... 416/142 |
| 5,642,982 | A | * | 7/1997 | Matuska et al. ......... 416/87 |
| 6,726,439 | B2 | | 4/2004 | Mikhail et al. |
| 6,902,370 | B2 | | 6/2005 | Dawson et al. |
| 6,923,622 | B1 | * | 8/2005 | Dehlsen ................. 416/87 |
| 6,983,844 | B2 | | 1/2006 | O'Kane et al. |
| 7,600,971 | B2 | * | 10/2009 | Damgaard et al. ......... 416/1 |
| 2005/0031431 | A1 | | 2/2005 | Wobben |
| 2005/0180833 | A1 | | 8/2005 | Almind |
| 2006/0251517 | A1 | | 11/2006 | Grabau |

FOREIGN PATENT DOCUMENTS

| EP | 1659026 | 5/2006 |
| WO | 2005005286 | 1/2005 |
| WO | 2005071261 | 8/2005 |

\* cited by examiner

*Primary Examiner* — Igor Kershteyn
(74) *Attorney, Agent, or Firm* — William F. Heinze; Ernest G. Cusick; Frank A. Landgraff

(57) ABSTRACT

A wind turbine blade stowage arrangement includes a first section of the wind turbine blade nested at least partially inside a second section of the wind turbine blade; and a conformable spacer, arranged between the first and second sections of the wind turbine blade, for positioning the first section inside the second section.

14 Claims, 3 Drawing Sheets

WIND TURBINE BLADE STOWAGE

BACKGROUND OF THE INVENTION

1. Technical Field

The subject matter described here generally relates to fluid reaction surfaces with specific blade structures that are formed with a main spar, and, more particularly to wind turbine blade stowage arrangements.

2. Related Art

A wind turbine is a machine for converting the kinetic energy in wind into mechanical energy. If that mechanical energy is used directly by machinery, such as to pump water or to grind wheat, then the wind turbine may be referred to as a windmill. Similarly, if the mechanical energy is further transformed into electrical energy, then the turbine may be referred to as a wind generator or wind power plant.

Wind turbines use one or more airfoils in the form of a "blade" to generate lift and capture momentum from moving air that is them imparted to a rotor. Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

Wind turbines are typically categorized according to the vertical or horizontal axis about which the blades rotate. One so-called horizontal-axis wind generator is schematically illustrated in FIG. 1 and available from GE Energy of Atlanta, Ga. USA. This particular configuration for a wind turbine 2 includes a tower 4 supporting a drive train 6 with a rotor 8 that is covered by a protective enclosure referred to as a "nacelle." The blades 10 are arranged at one end of the rotor 8, outside the nacelle, for driving a gearbox 12 connected to an electrical generator 14 at the other end of the drive train 6 arranged inside the nacelle along with a control system 16. An anemometer 18 and/or other sensing devices may be mounted on or near the nacelle of the wind turbine 2.

The wind turbine blades 10 may be telescopic or retractable. For example, U.S. Pat. No. 6,902,370 discloses a telescoping wind turbine blade having a moveable section that is nested within a larger fixed section. FIG. 5 of that patent illustrates a slider track that is attached to the fixed blade portion and a slider that is attached to the moveable portion. U.S. Pat. No. 6,726,439 also discloses retractable rotor blades for power generating wind an ocean current turbines. However, even these wind turbine blades and/or their component parts are often so large that they are difficult to store and/or transport.

Various techniques have been proposed to address the difficulties associated with wind turbine blade stowage. For example, U.S. Pat. No. 6,983,844 discloses a package system for transporting wind turbine blades where the root section of a blade is packed in a first package while the tip is packed in a second package with inner packing material made of glass fibre, wood, or foamed rubber. European Patent Application No. 1,659,026 discloses a transport device for an elongate object such as a rotor blade for a wind turbine or the like. U.S. Patent Publication No. 2005/0180833 discloses a transport container for wind turbine blades and U.S. Patent Publication No. 2006/0251517 discloses a method of transporting and storing a wind turbine blade and

BRIEF DESCRIPTION OF THE INVENTION

These and other aspects of such conventional approaches are addressed here by providing, in various embodiments, a wind turbine blade stowage arrangement, including a first section of the wind turbine blade nested at least partially inside a second section of the wind turbine blade; and a conformable spacer, arranged between the first and second sections of the wind turbine blade, for positioning the first section inside the second section.

BRIEF DESCRIPTION OF THE DRAWINGS

Various aspects of this technology invention will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
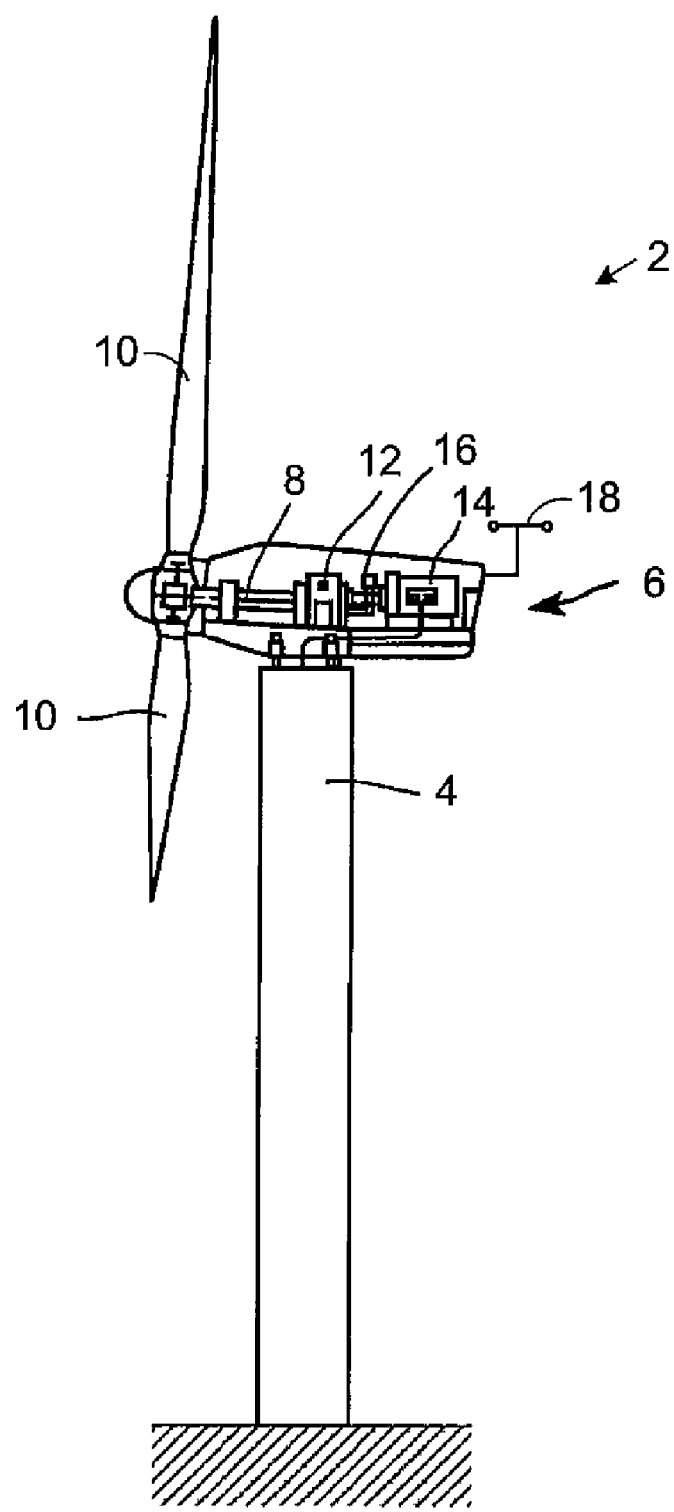
FIG. 1 is a schematic side view of a conventional wind turbine.
Figure 2:
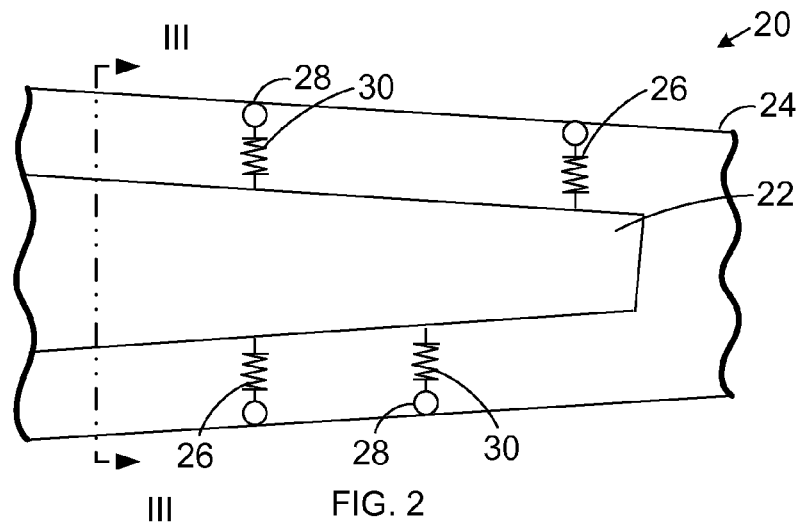
FIG. 2 is a schematic, partial cross-sectional view of a stowage arrangement for the wind turbine blade shown in FIG. 1.

FIG. 2 is a spanwise cross-sectional view of one example of a stowage arrangement 20 for the wind turbine blade 10 shown in FIG. 1. However the stowage arrangement may also be used with other wind turbine blades.

In FIG. 2, a first section 22 of the wind turbine blade 10 is nested inside a larger second section 24 of the wind turbine blade. Although only two nested sections are discussed below, any other number of sections may also be provided. In this example, the first section 22 may be partially or fully nested in the second section 24. For example, some of the first section 22 may extend out of the end of the second section 24. As discussed in more detail below, a conformable spacer positions the first section 22 inside the second section 24. For example, the conformable spacer may include Styrofoam® and/or other conformable foam components. An inflatable, or otherwise expandable, bladder may also be provided.

In the examples illustrated here, the conformable spacer includes one or more spacer assemblies 26 extending from the first (inner) section 22 of the wind turbine blade 10. However, some or all of the spacer assemblies 26 may alternatively extend from the second (outer) section of the wind turbine blade 10. The illustrated spacer assemblies include a roller 28 for engaging an inside surface of the second section 24 of the wind turbine blade. For example, the roller may include a wheel, ball, or bearing for minimizing friction when the first section 22 is slid into the second section 24.

The illustrated spacer assemblies also include a spring 30 for expanding so as to urge the roller 28 into contact and conformance with the internal surface of the second section 24. The springs 30 may also help to prevent the outer walls of the first section 22 from engaging the inner walls of the second section 24 during assembly, positioning, transport, and/or storage of the stowage arrangement 20. Although illustrated in the Figures as coil springs, the springs 30 may also include leaf, V, cantilever, Belleville, gas, electrical, magnetic, elastic, and/or other springs.

Figure 3:
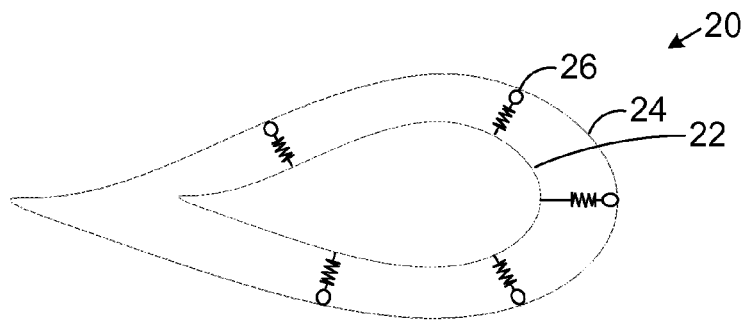
FIG. 3 is a schematic cross-sectional view along section line III-III in FIG. 2.

FIG. 3 is a schematic cross-sectional view along section line III-III in FIG. 2. As illustrated in FIG. 3, the spacer assemblies 26 may be arranged at various positions around the periphery of the first (inner) section 22 of the wind turbine blade 10. In addition, groups of spacer assemblies 26 may be arranged substantially coplanar with a chord line on either of the first or second sections 22 or 24. For example, two or more spacer assemblies 26 may be arranged on opposite sides of the first (inner) section 22 for positioning the first section in two dimensions. Three spacer assemblies 26 may be arranged at three equal, or unequal, angles around the periphery for positioning the first section 22 in three dimensions.

Figure 4:
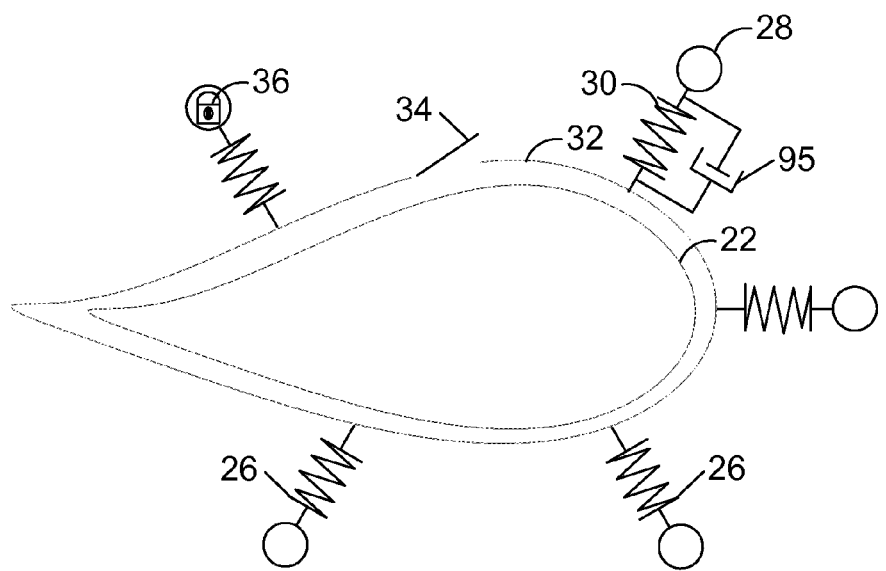
FIG. 4 is an enlarged view of a portion of the stowage arrangement in FIG. 3.

FIG. 4 is an enlarged view of a portion of the stowage arrangement in FIG. 3. In FIG. 4, four spacer assemblies 26 are arranged on a harness 32 that encircles the first (inner) section 22. For example, the harness 32 may be shaped to conform with a particular periphery of the first section 22 near the tip of the blade 10. Alternatively, the harness 32 may be formed from a flexible material in order to conform to other peripheries of the first section 22. For example, multiple harnesses 32 may be provide at different positions along the first section 22. An optional, releasable closure 34 may also be provided on the harness 32. The closure may also be adjustable for varying the length of the harness 32 in order to accommodate multiple positions of various along the length of the first section 22.

One or more of the spacer assemblies 26 may be further provided with a lock 36 for maintaining a position of the wheel relative to the second section of the wind turbine blade. For example one or more of the rollers 28 may be a lockable roller or lockable wheel. Alternatively, the lock 36 may be formed as a recess or other feature on the second (outer) section 24 for receiving the roller 28. The lock 36 may also be provided separate from the spacer assemblies 26. Alternatively, or in addition, one or more of the spacer assemblies 26 may be provided with dampening for dissipating energy transfer between the first and second sections of the wind turbine blade. For example, a damper 38 or other shock absorber may be provided. The damper 38 may also be provided separate from the spacer assembly 26.

Figure 5:
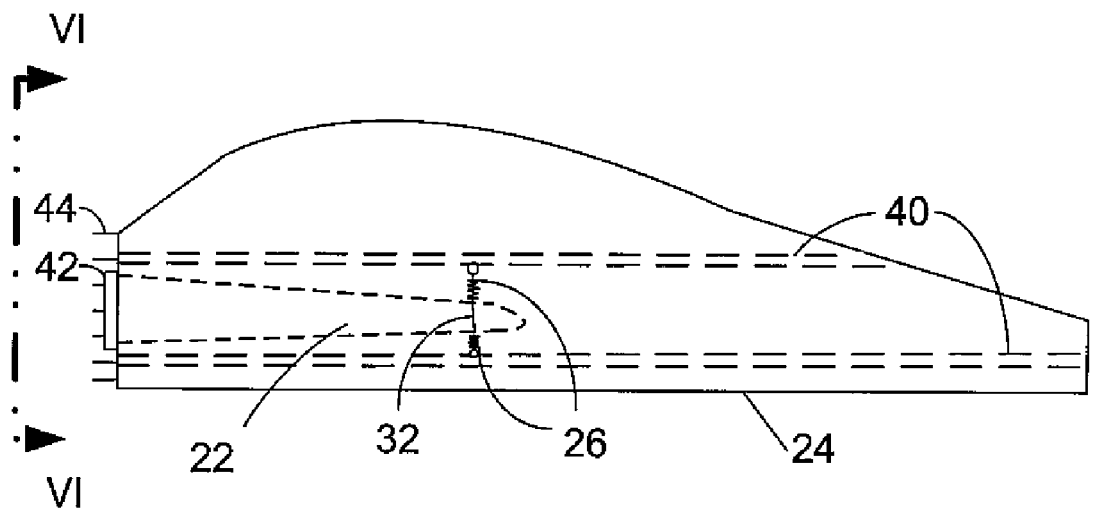
FIG. 5 is a side view of a wind turbine blade stowage arrangement.
Figure 6:
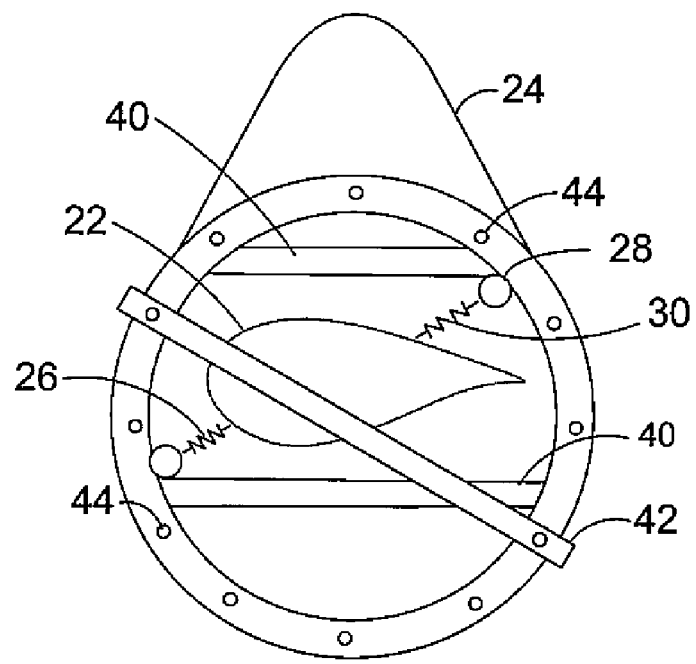
FIG. 6 is an end view from section line VI-VI in FIG. 5.

FIG. 5 is a spanwise schematic side view of another example of a stowage arrangement 20 for the wind turbine blade 10 shown in FIG. 1. FIG. 6 is an end view of the stowage arrangement 20 from section line VI-VI in FIG. 5. In FIGS. 5 and 6, first (inner) section 22 of the wind turbine blade is arranged between spars 40 of the second (outer) section 24 of the wind turbine blade. Two spacer assemblies 26 are arranged the a harness 32 near the tip of the first section 22 so as to conform to the joint area between the spars 40 and the second section 24. However, other numbers and configurations of spacer assemblies 26 and/or other conformable spacers may also be used.

In FIGS. 5 and 6, the first section 22 is also secured to the second section 24 by a locking bar 42 for additional stabilization. For example, the locking bar 42 may be releasably secured to the first (inner) section 22 in any reasonable fashion and then bolted to the rods 44 that typically extend front the root end of the second (outer) section 24 for securing the blade 10 to the rotor 8. Additional expandable spacers 26, with or without rollers 28, may also be provided near the inboard end of the first section 22. Expandable bladders, expandable foam, sawdust, cloth, Styrofoam® type, and/or other packing material may be also used to tightly fill any remaining gaps between the first section 22 and the second section 24, in order to further minimize the possibility of load shifting during transit.

The technology described above offers various advantages over conventional approaches. For example, the stowage arrangement 20 reduces the space that is required in order to store and transport the wind turbine blade 10. The stowage arrangement 20 also helps to reduce wear and tear on adjacent surfaces of the blades 10 during transportation and storage. Furthermore, the stowage arrangement 20 may be easily used with a variety of blade shapes and with various types of spacers, including inflatable supports arranged on other parts of the blade 10.

It should be emphasized that the embodiments described above, and particularly any "preferred" embodiments, are merely examples of various implementations that have been set forth here to provide a clear understanding of various aspects of this technology. It will be possible to alter many of these embodiments without substantially departing from scope of protection defined solely by the proper construction of the following claims.

What is claimed is:

1. A wind turbine blade stowage arrangement, comprising:
   a first section of the wind turbine blade nested at least partially inside a second section of the wind turbine blade;
   a conformable spacer, arranged between the first and second section of the wind turbine blade, for positioning the first section inside the second section;
   wherein the spacer comprises a roller for engaging an inside surface of the second section of the wind turbine blade; and
   a lock for maintaining a position of the roller relative to the second section of the wind turbine blade.

2. The wind turbine blade stowage arrangement recited in claim 1, wherein the roller comprises a wheel for rolling against the inside surface of the second section of the wind turbine blade.

3. A wind turbine blade stowage arrangement, comprising:
   a first section of the wind turbine blade nested at least partially inside a second section of the wind turbine blade;
   a conformable spacer, arranged between the first and second section of the wind turbine blade, for positioning the first section inside the second section; and
   a damper for dissipating energy transfer between the first and second sections of the wind turbine blade.

4. The wind turbine blade stowage arrangement recited in claim 3, wherein the spacer extends from the first section of the wind turbine blade.

5. The wind turbine blade stowage arrangement recited in claim 3, wherein the spacer comprises a roller for engaging an inside surface of the second section of the wind turbine blade.

6. The wind turbine blade stowage arrangement recited in claim 5, wherein the roller comprises a wheel for rolling against the inside surface of the second section of the wind turbine blade.

7. The wind turbine blade stowage arrangement recited in claim 5, further comprising a lock for maintaining a position of the roller relative to the second section of the wind turbine blade.

8. The wind turbine blade stowage arrangement recited in claim 6, wherein the wheel comprises a lock for maintaining a position of the wheel relative to the second section of the wind turbine blade.

9. A wind turbine blade stowage arrangement, comprising:
a first section of the wind turbine blade nested at least partially inside a second section of the wind turbine blade;
means, arranged between the first and second sections of the wind turbine blade, for positioning the first section inside the second section; and
wherein the positioning means comprises means for rolling against an inside surface of the second section of the wind turbine blade.

10. The wind turbine blade stowage arrangement recited in claim 9, wherein the positioning means extends from the first section of the wind turbine blade.

11. The wind turbine blade stowage arrangement recited in claim 9, further comprising means for maintaining a position of the rolling means relative to the second section of the wind turbine blade.

12. The wind turbine blade stowage arrangement recited in claim 10, further comprising means for maintaining a position of the rolling means relative to the second section of the wind turbine blade.

13. The wind turbine blade stowage arrangement recited in claim 11, further comprising means for dissipating energy transfer between the first and second sections of the wind turbine blade.

14. The wind turbine blade stowage arrangement recited in claim 12, further comprising means for dissipating energy transfer between the first and second sections of the wind turbine blade.

* * * * *